(12) United States Patent
Takaya

(10) Patent No.: US 8,291,561 B2
(45) Date of Patent: Oct. 23, 2012

(54) THERMOSTAT INSTALLING STRUCTURE

(75) Inventor: Yoshihiro Takaya, Okayama (JP)

(73) Assignee: Uchiyama Manufacturing Corp., Okayama-shi, Okayama (JP)

( * ) Notice: Subject to any disclaimer, the term of this patent is extended or adjusted under 35 U.S.C. 154(b) by 726 days.

(21) Appl. No.: 12/308,376

(22) PCT Filed: Jun. 4, 2007

(86) PCT No.: PCT/JP2007/061260
§ 371 (c)(1),
(2), (4) Date: Jun. 4, 2009

(87) PCT Pub. No.: WO2007/145092

PCT Pub. Date: Dec. 21, 2007

(65) Prior Publication Data
US 2010/0077583 A1 Apr. 1, 2010

(30) Foreign Application Priority Data

Jun. 12, 2006 (JP) ................. P2006-161740

(51) Int. Cl.
*B23P 19/04* (2006.01)
*F01P 7/16* (2006.01)
(52) U.S. Cl. .............. 29/213.1; 236/34.5; 123/41.1
(58) Field of Classification Search ............. 29/213.1; 236/34.5, 100; 123/41.1; 251/333
See application file for complete search history.

(56) References Cited

U.S. PATENT DOCUMENTS

| 2,323,533 A | * | 7/1943 | Giesler | 236/34.5 |
| 4,524,907 A | * | 6/1985 | Wong | 236/34.5 |
| 4,913,101 A | * | 4/1990 | Sliger | 123/41.1 |

FOREIGN PATENT DOCUMENTS

| JP | 05-044468 | 2/1993 |
| JP | 07-301362 | 11/1995 |
| JP | 3485629 | 11/1995 |
| JP | 2003-239743 | 2/2002 |
| JP | 2003 239 743 A | 8/2003 |
| JP | 2005 214 269 A | 8/2005 |
| JP | 2005-214269 | 8/2005 |

* cited by examiner

*Primary Examiner* — Hadi Shakeri
(74) *Attorney, Agent, or Firm* — Bacon & Thomas, PLLC

(57) ABSTRACT

The thermostat installing structure is provided, according to which a thermostat can be installed stably in the circulation path of cooling medium, and the circulation path of cooling medium can be also fastened to the body of an internal combustion engine without causing any damage to the function of the thermostat. The thermostat (5) comprises a frame (12) formed integrally with an annular supporting substrate (6) having the inner circumferential edge portion serving as a valve seat (6a) and regulating a projecting head portion (7a) of an extendable rod (7), whereby the thermostat is installed between the circulation path of cooling medium and the cooling medium channel of the internal combustion engine in a manner that the circulation path of cooling medium and the internal combustion engine body are integrally fastened by fixing the thermostat at a predetermined position in the circulation path of cooling medium with the fixing means and thereafter fitting a gasket.

4 Claims, 10 Drawing Sheets

THERMOSTAT INSTALLING STRUCTURE

TECHNICAL FIELD

The present invention relates to a thermostat installing structure which is interposed between a cooling medium channel of an internal combustion engine and a circulation path of cooling medium for cooling and circulating a cooling medium for cooling the internal combustion engine and which controls the flow of the cooling medium between the circulation path of cooling medium and the cooling medium channel of the internal combustion engine.

BACKGROUND ART

A thermostat is interposed in the connecting portion between a cooling water channel of an engine body and an inlet housing or an outlet housing connected to a radiator for controlling the temperature of a cooling water circulating in a water jacket (cooling water channel) in an internal combustion engine. The thermostat is designed such that a valve is actuated by the temperature of the cooling water in the cooling water channel to automatically control the flow of the cooling water from the radiator into the cooling water channel. Such a thermostat is disclosed in the following patent document Japanese Patent No. 2640188 and Japanese patent document Japanese Patent No. 3485629. According to these thermostats, a thermo-wax of which phase is changed from solid (crystal) to liquid following the change of water temperature is enclosed in a valve casing (actuator) and a rod is elongated and contracted by the expansion-contraction of the thermo-wax by the phase change, thereby converting the movement of the rod into the valve operation to open and close the channel of the cooling water.

The above-mentioned thermostat is assembled as a single member and is incorporated into the connecting portion between the inlet housing or the outlet housing and the engine body as it is. Or a constituting member of the thermostat is assembled into the inlet housing or the outlet housing and the thermostat may be constructed in the inlet housing or in the outlet housing. In these days, assembling the internal combustion engine, members required for the parts constituting the engine are incorporated in advance and are assembled at the final assembling stage of the engine. Therefore, it is required to provide a system in the inlet housing or the outlet housing in which required members such as thermostat are incorporated in advance, and packed and carried to be brought in the final assembling stage of the engine. The thermostat disclosed in the Japanese patent documents is capable of assembling into the inlet housing or the outlet housing in advance, so that it can satisfy the above-mentioned needs.

DISCLOSURE OF INVENTION

Problems to be Solved in the Invention

The thermostat disclosed in the Japanese patent document No. 2640188 is constructed such that an elastically pressing part and a flange pressing part for fitting the thermostat in a thermostat chamber (outlet housing) are provided for a spring gasket arranged between the thermostat chamber and the engine body and the spring gasket elastically abuts on the thermostat by the elastically pressing part to fix the thermostat into the thermostat chamber by means of the flange pressing part. Thus, the thermostat is designed to be capable of being incorporated in the thermostat chamber in advance. However, because the spring gasket works to fix and fix the thermostat and also to seal between the thermostat chamber and the engine body, there may be fear that both functions are not sufficiently achieved. Namely, the rigidity is required for latching and fixing, to the contrary, the elasticity for generating an appropriate reaction force is required for sealing ability, and these characteristics conflict with each other.

On the other hand, according to the thermostat disclosed in the Japanese patent document No. 3485629, each constituting member of the thermostat is sequentially assembled in the inlet housing so as to be built up therein. Such a thermostat can be taken in the final stage of the engine assembling while the thermostat is incorporated in the inlet housing in advance, so that it can meet the above-mentioned needs. However, when each constituting member is assembled in the inlet housing, it is required to attach a return spring being in an elastically energized condition between the inlet housing and the frame of the thermostat. Such an operation is very difficult and troublesome.

Further, these thermostats are fixed to the outlet housing or the inlet housing without allowance, so that if there is a position displacement based on the design tolerance when the outlet housing or the inlet housing is fastened or fixed into the engine body, the thermostat can hardly follow such a position displacement. Therefore, there generate stress on each member by the fastening to disturb the open-close operations of the valve and to damage the sealing ability of the connecting portion between the engine body and the outlet housing or the inlet housing.

The present invention is proposed in view of the above-mentioned conditions and the object of the present invention is to provide a thermostat installing structure in which a thermostat can be stably incorporated in a circulation path of cooling medium and the circulation path of cooling medium can be fastened and fixed into an internal combustion body without disturbing the function of the thermostat.

Means to Solve the Problems

According to the present invention, the thermostat installing structure is interposed between a cooling medium channel in an internal combustion engine body and a circulation path of cooling medium provided at a radiator side and connected to the internal combustion engine body and the thermostat controls circulation of the cooling medium between the circulation path of cooling medium and the cooling medium channel. The thermostat comprises an annular supporting substrate of which inner circumferential edge portion serves as a valve seat; a valve casing having an extendable rod with a projected head, the extendable rod being so constructed as to be extended by the temperature of the cooling medium in the cooling medium channel of the internal combustion engine body; a valve body secured to the valve casing and moved by the extendable rod to contact with and separate from the valve seat for open and close operation; a supporting frame integrally formed with the supporting substrate and provided with a resilient means to elastically support the valve body relative to the valve seat side, for slidably guiding the valve casing along the longitudinal direction of the rod; a regulatory frame integrally formed with the supporting substrate, for regulating the projected head of the rod; and a gasket fitted on the supporting substrate. A fixing means for the thermostat is provided between the supporting substrate and an inner wall portion of the circulation path of cooling medium, and the thermostat is installed between the circulation path of cooling medium and the cooling medium channel of the internal combustion engine in a manner that the circulation path of cooling medium and the internal combustion engine body are integrally fastened by fixing the thermostat at a predetermined position in the circulation path of cooling medium with the fixing means, with the gasket interposed therebetween.

The fixing means may be provided in the supporting substrate and comprises at least a pair of tongue pieces bent into an expanding diametrical direction and a recess portion concavely formed on the inner wall face of the circulation path of cooling medium for receiving a tip portion of the tongue piece therein. The tongue piece may be a cut and raised portion integrally formed with the supporting substrate. The tongue piece may be a separately formed member from the supporting substrate and is integrally joined with the supporting substrate. Further, the tongue piece may be so constructed as to be received the tip portion of the tongue piece in the recess portion by elastically deforming the tongue piece to contract in its diametrical direction.

The fixing means may comprise at least a pair of tongue pieces including a rising portion raised from the supporting substrate and a spring piece portion of which tip portion is bent and a step portion formed in the inner surface of the circulation path of cooling medium for supporting the thermostat therewith by elastically deforming the spring piece portion of the tongue piece.

The fixing means may comprise a projected portion projecting from the inner wall face of the circulation path of cooling medium and supporting the regulatory frame therewith and the regulatory frame. In this case, the projected portion may have at its end a holding piece to hold and support the regulatory frame therewith, as mentioned in claim 8.

The internal combustion engine may be a water cooling engine which uses a cooling water as the cooling medium and uses a radiator as a cooling body. In this case, the circulation path of cooling medium may be provided in the inlet housing attached to the engine body to supply a cooling water in the cooling water channel of the engine body from the radiator.

Effect of the Invention

According to the thermostat installing structure, the thermostat is fixed at a predetermined position in the circulation path of cooling medium with the fixing means provided between the supporting substrate and the inner wall portion of the circulation path of cooling medium. Therefore, the thermostat does not drop out of the circulation path of cooling medium in case of packing and transporting for bringing into a final assembling stage of the internal combustion engine, thereby contributing the rationalization of assembling system of the internal combustion engine. Further, the thermostat is constructed as a single component as mentioned above, so that it has good handleability. Still further, it is only fixed to the circulation path of cooling medium, thereby simplifying the incorporating operation to the circulation path of cooling medium as a pre-stage of the internal combustion engine assembly. In addition, the gasket interposed when the circulation path of cooling medium and the internal combustion engine body are integrally fastened achieves only the sealing function, therefore, it may use an elastic body suitable as a sealing material such as rubber, resin and the like which can achieve sealing function by the pressure of fastening.

The tip portion of the pair of tongue pieces provided in the supporting substrate is received in the recess portion formed on the inner wall face of the circulation path of cooling medium, thereby simplifying the fixture of the thermostat to the circulation path of cooling medium. Such a fixing is done by receiving the tip portion of the tongue piece in the recess portion, so that if there is position displacement by the design tolerance therebetween when the circulation path of cooling medium is fastened and fixed to the internal combustion engine, the positional displacement can be absorbed in the received portion and the stress does not act on the thermostat itself, so that there is no fear of disturbing the appropriate open and close operation of the valve and the sealing ability of the gasket.

The tongue piece is elastically deformed in the contracting diametrical direction so as to elastically receive the tip portion of the tongue piece in the recess portion by the restoring resilience, thereby simplifying the fixing operation, stabling the fixing, elastically achieving the reception of the tip portion of the tongue piece by the recess portion, and further enabling effective absorption of the position displacement. When the tongue piece is a cut and raised portion from the supporting substrate, the punch-out portion which is usually discarded can be used as the tongue piece when the supporting substrate is produced by metal processing of punching a metal sheet, thereby improving the process yield.

The thermostat can be elastically supported to the circulation path of cooling medium only by elastically contacting the spring piece portion of the tongue piece to the step portion formed in the inner wall of the circulation path of cooling medium, thereby simplifying the fixing operation and effectively achieving the absorption function of the position displacement as mentioned above.

The regulatory frame can appropriate to the constructing portion of the fixing means without specifically processing the thermostat, so that a prior stand-alone thermostat can be used. When the holding piece of the projected portion is designed to hold and support the regulatory frame therewith, the fixing operation of the thermostat relative to the circulation path of cooling medium can be more simplified.

The objective internal combustion engine is a water cooling engine, thereby remarkably contributing the rationalization of the engine assembling system. In addition, the thermostat appropriately operates in such a water cooling engine, thereby contributing to keep the accurate operation of the water cooling engine.

EXPLANATION OF REFERENCE NUMERAL

Best Mode for Carrying out the Invention

Figure 1:
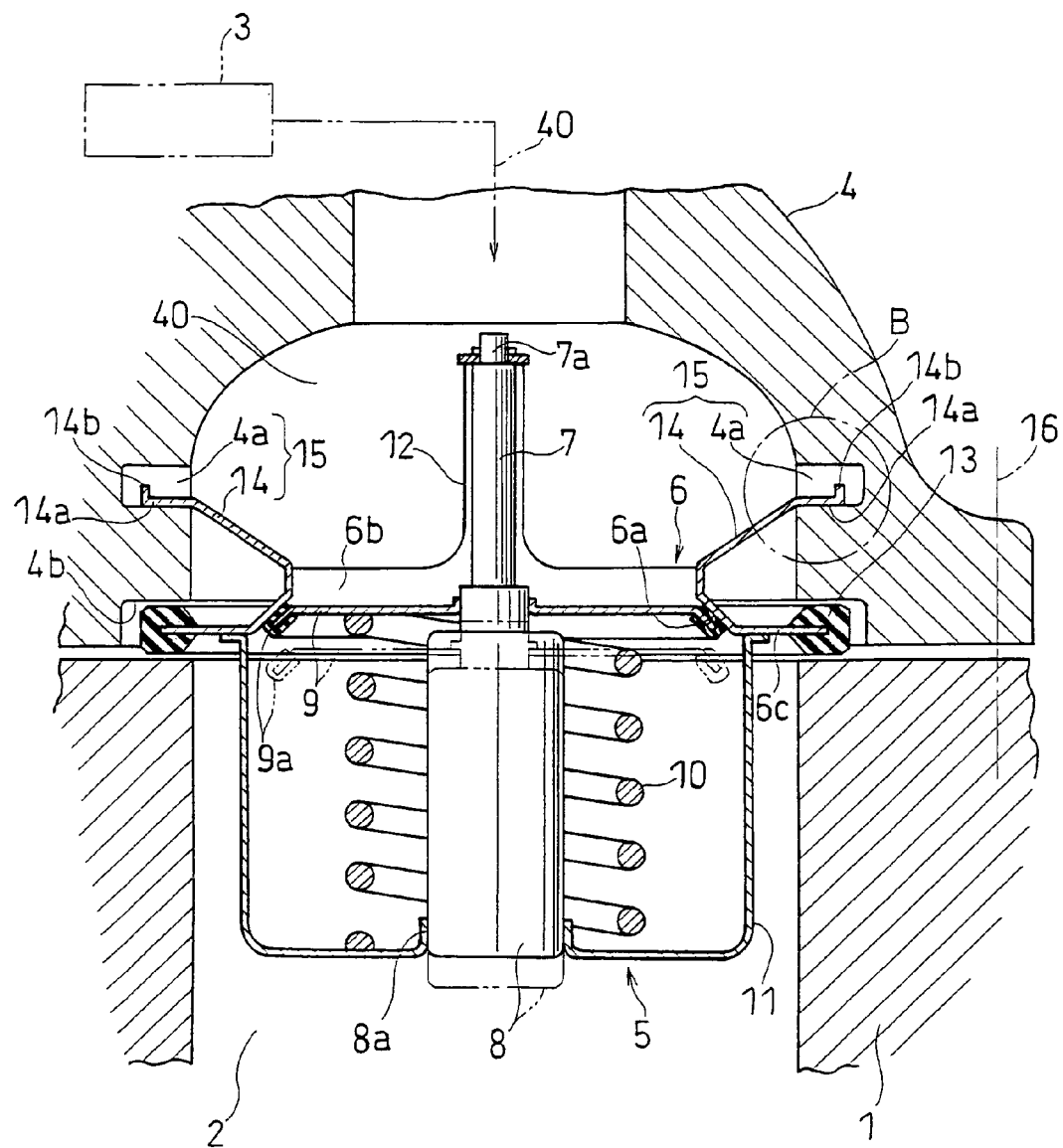
FIG. 1 is a vertical sectional view showing the first embodiment of a thermostat installing structure according to the present invention.
Figure 2:
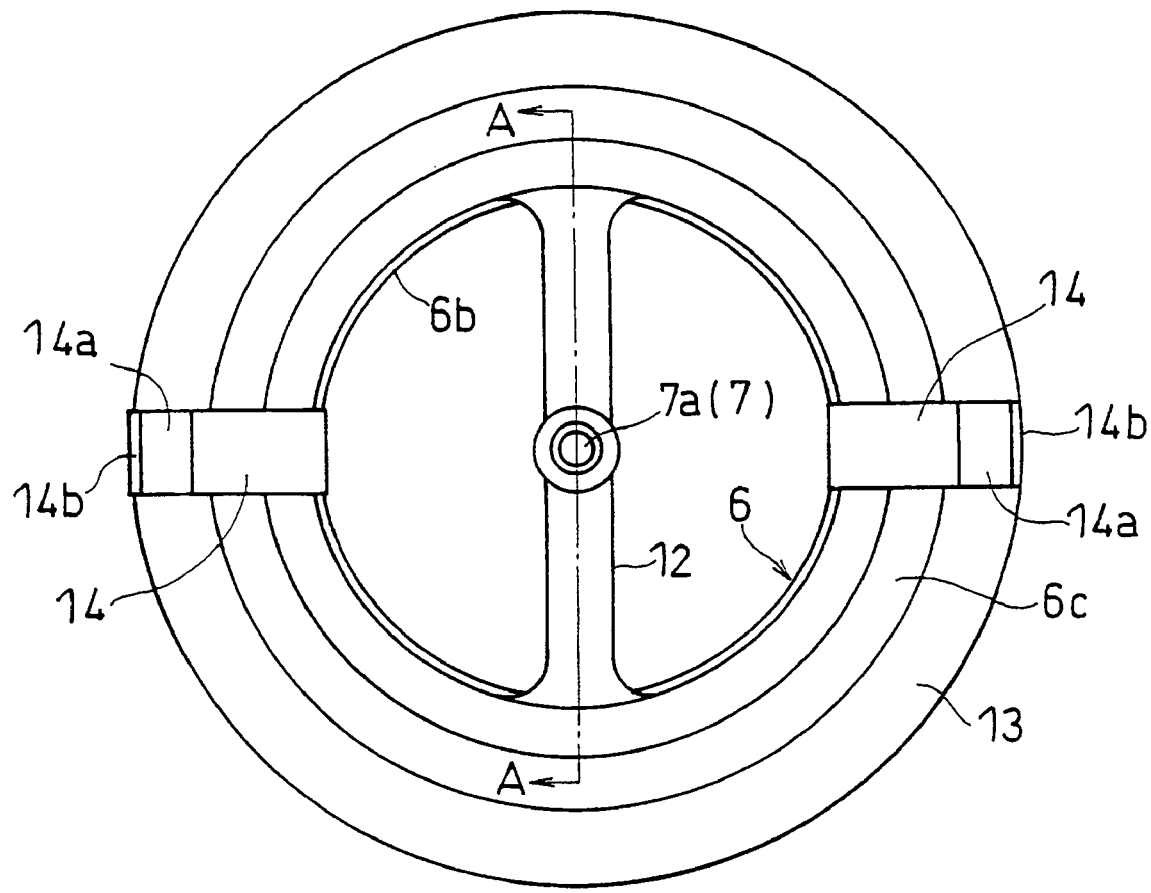
FIG. 2 is a plan view of the thermostat in the same embodiment.
Figure 3:
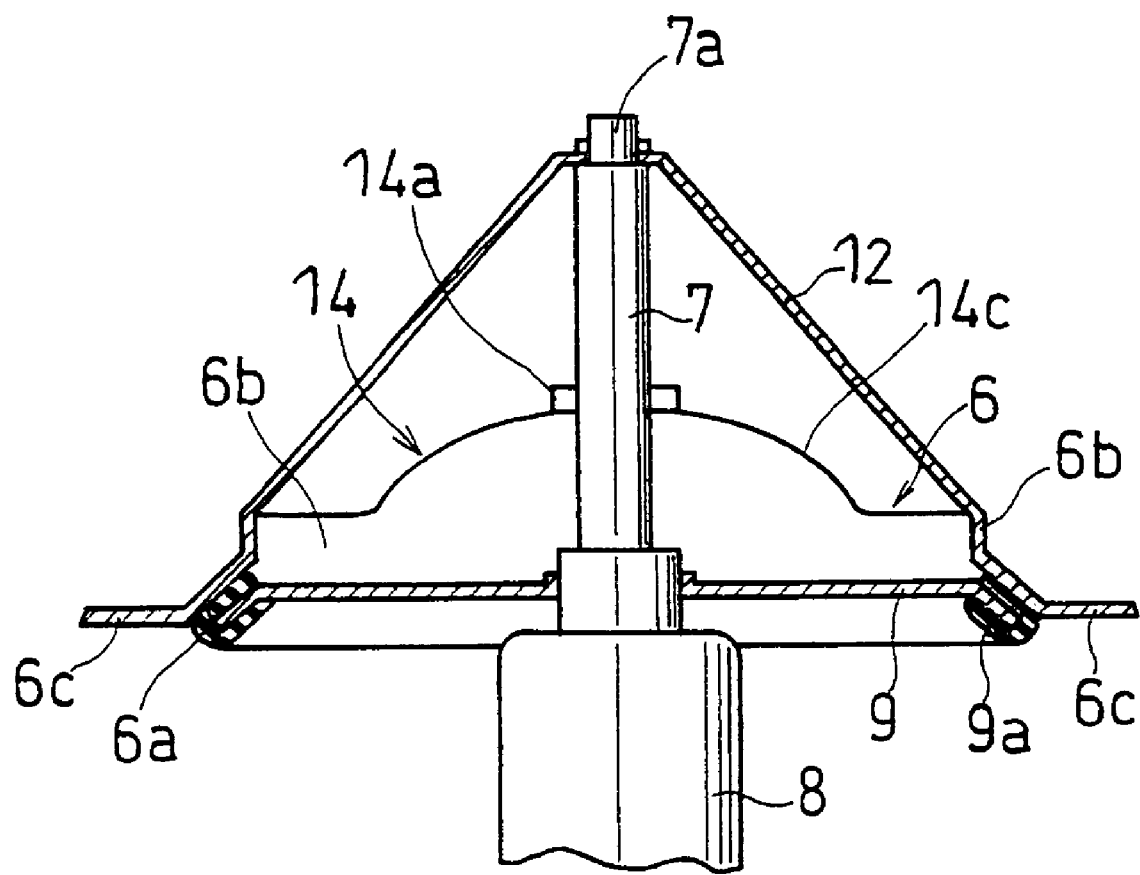
FIG. 3 is a view showing a modified example of the embodiment corresponding to a fragmental section along the line A-A of FIG. 2.
Figure 4A:
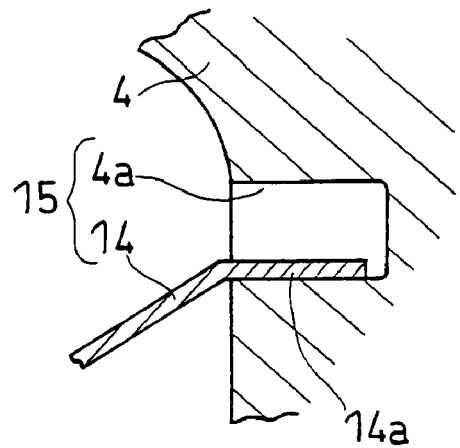
FIG. 4*a*, FIG. 4*b* and FIG. 4*c* show a modified example of the embodiment corresponding to the part "B" in FIG. 1.
Figure 4B:
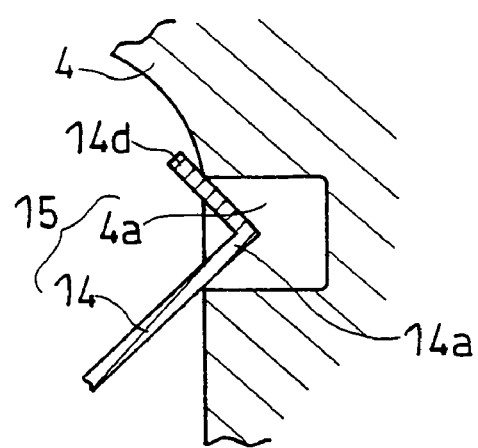
Figure 4C:
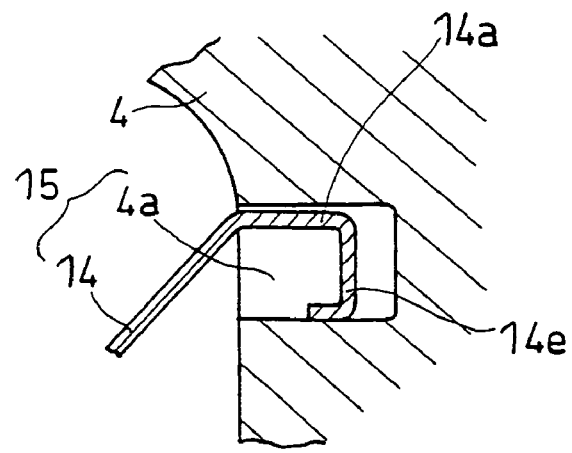
Figure 5:
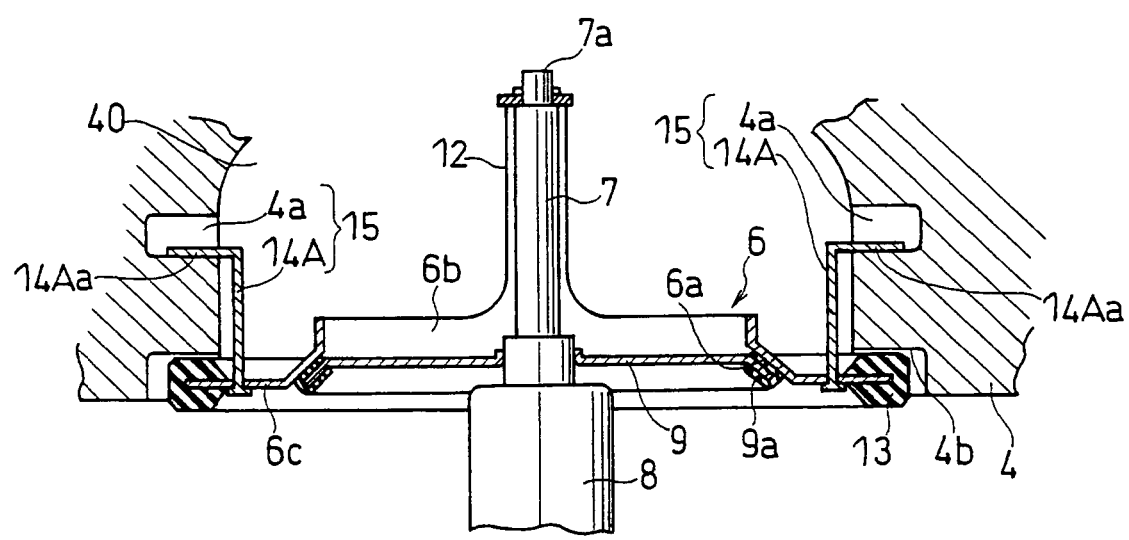
FIG. 5 is a sectional view of the substantial part of the second embodiment according to the present invention.
Figure 6:
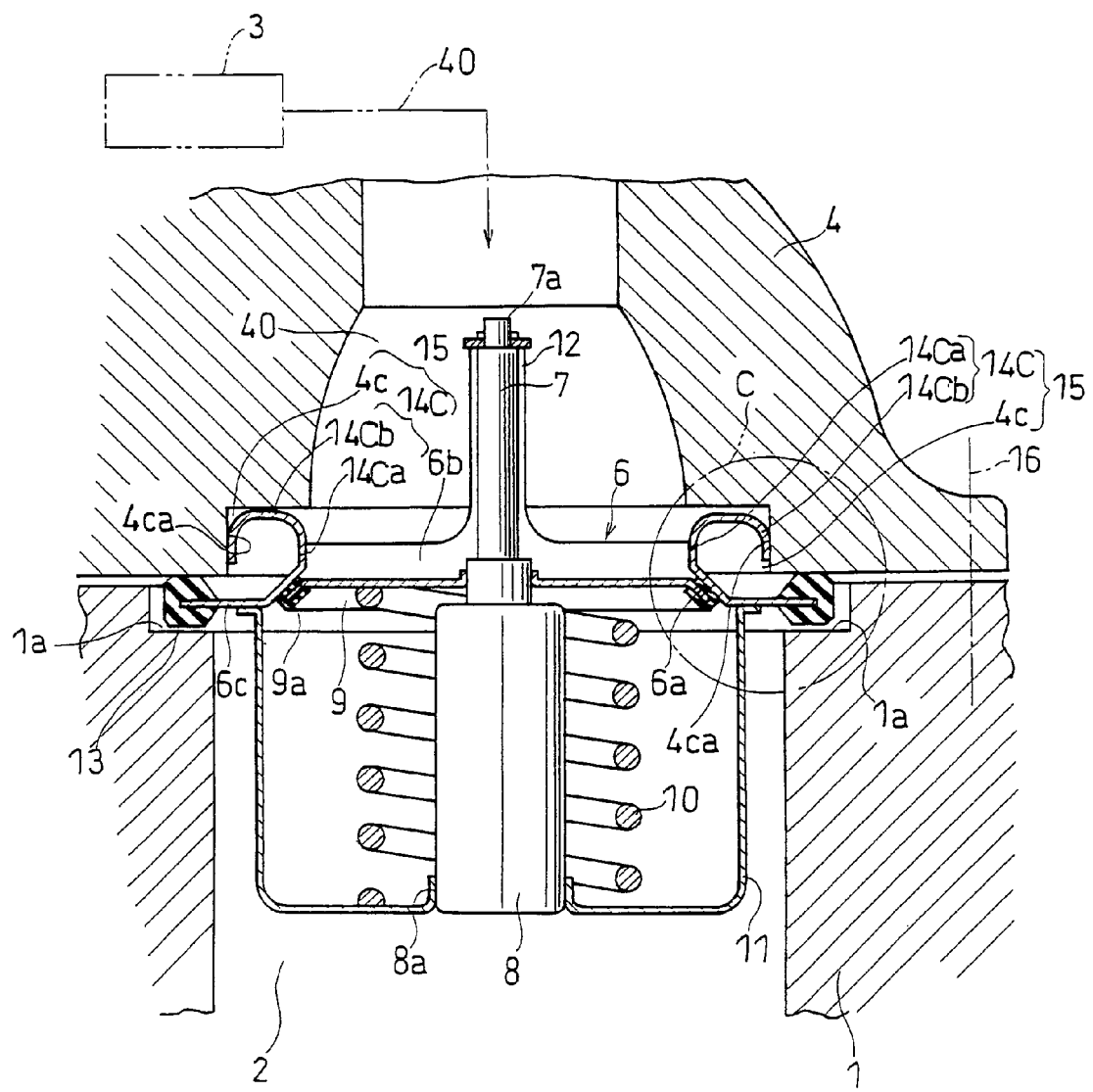
FIG. 6 is a sectional view of the third embodiment according to the present invention.
Figure 7A:
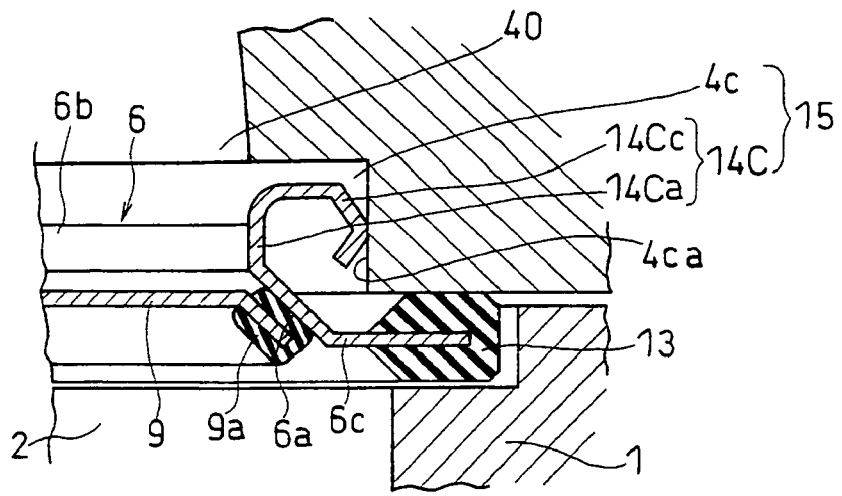
FIG. 7*a*, FIG. 7*b* and FIG. 7*c* show a modified example of the embodiment corresponding to the part "C" in FIG. 6.
Figure 7B:
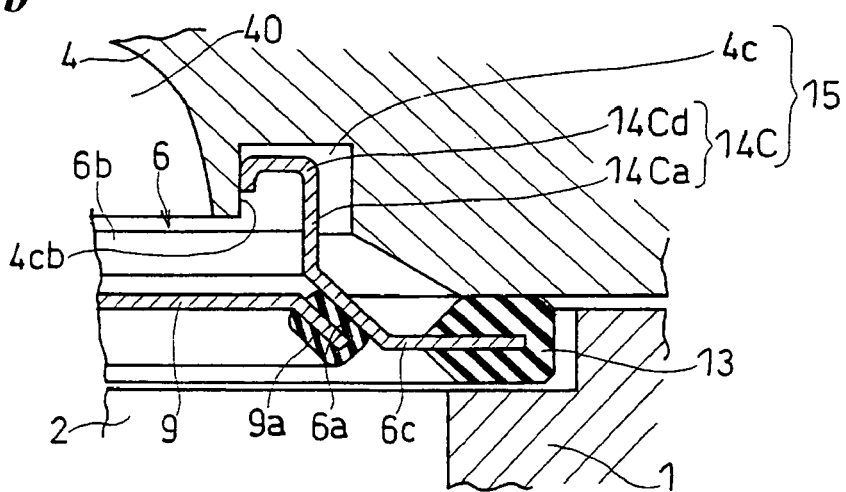
Figure 7C:
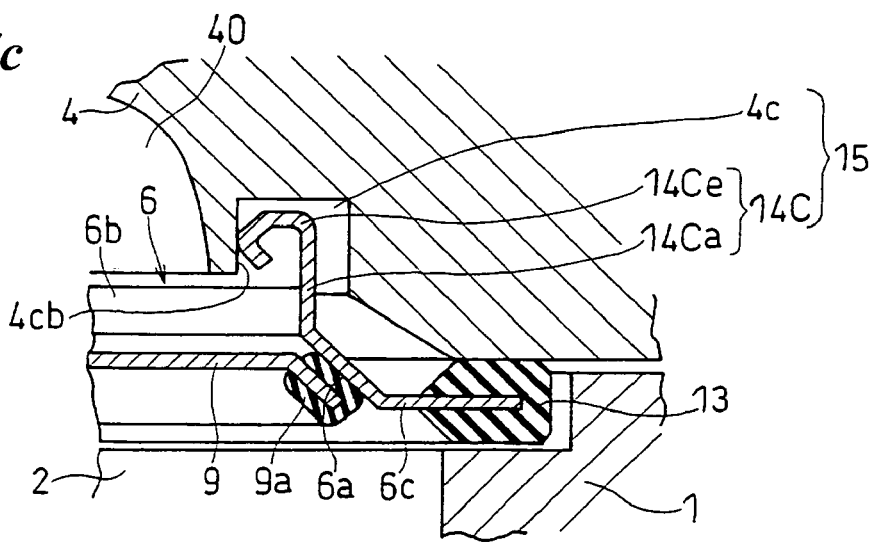
Figure 8:
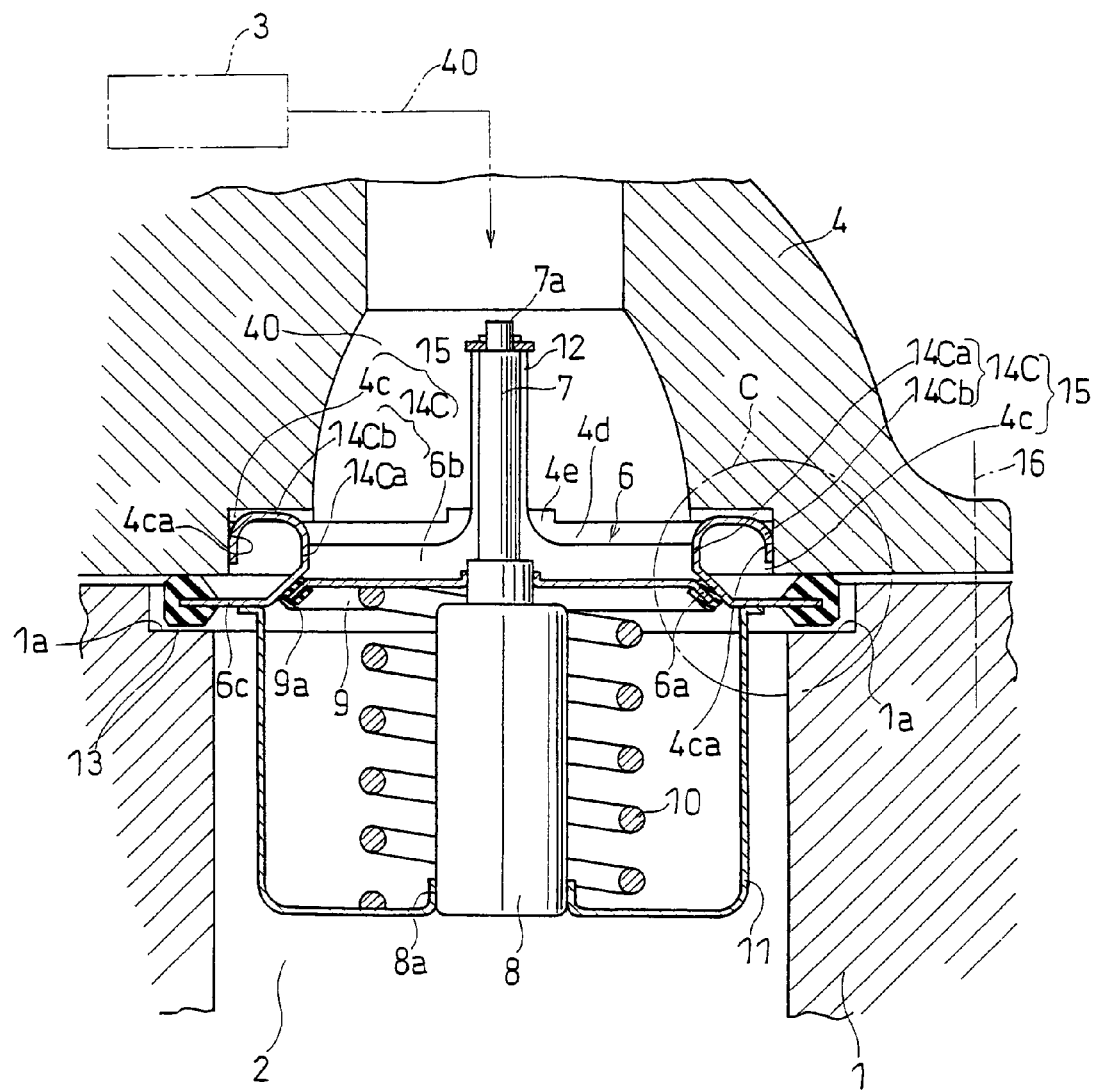
FIG. 8 is a view similar to that of FIG. 6 in a further modified example of the embodiment.
Figure 9:
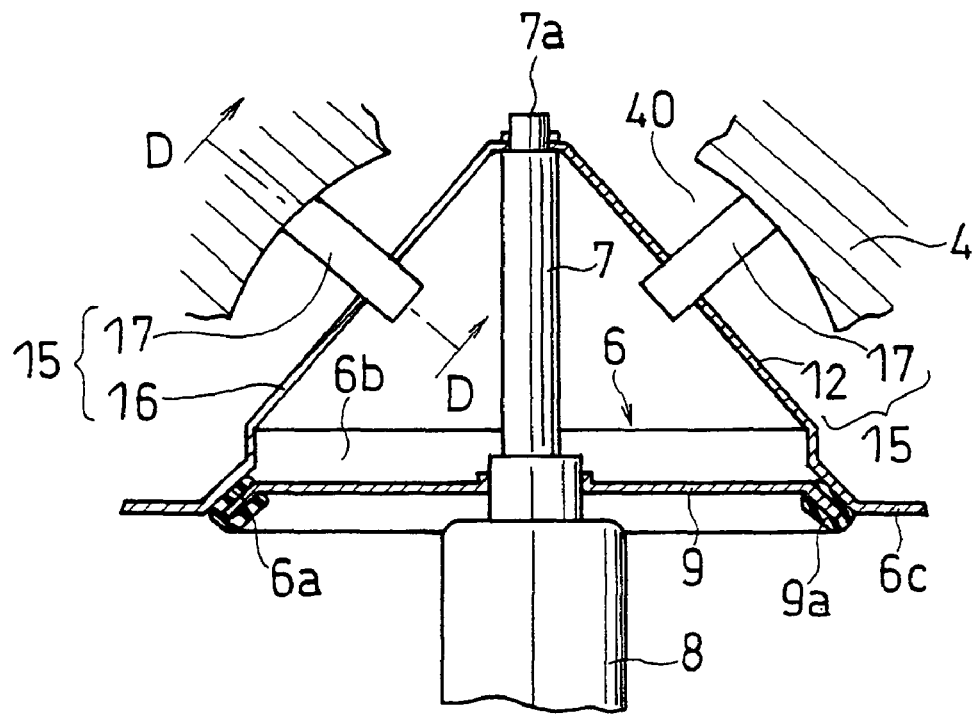
FIG. 9 is a sectional view of the substantial part of the fourth embodiment according to the present invention.
Figure 10:
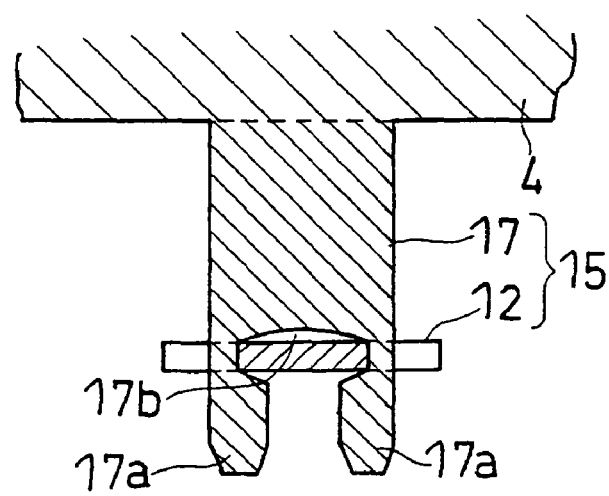
FIG. 10 is a fragmental enlarged sectional view along the line D-D of FIG. 9.
Figure 11:
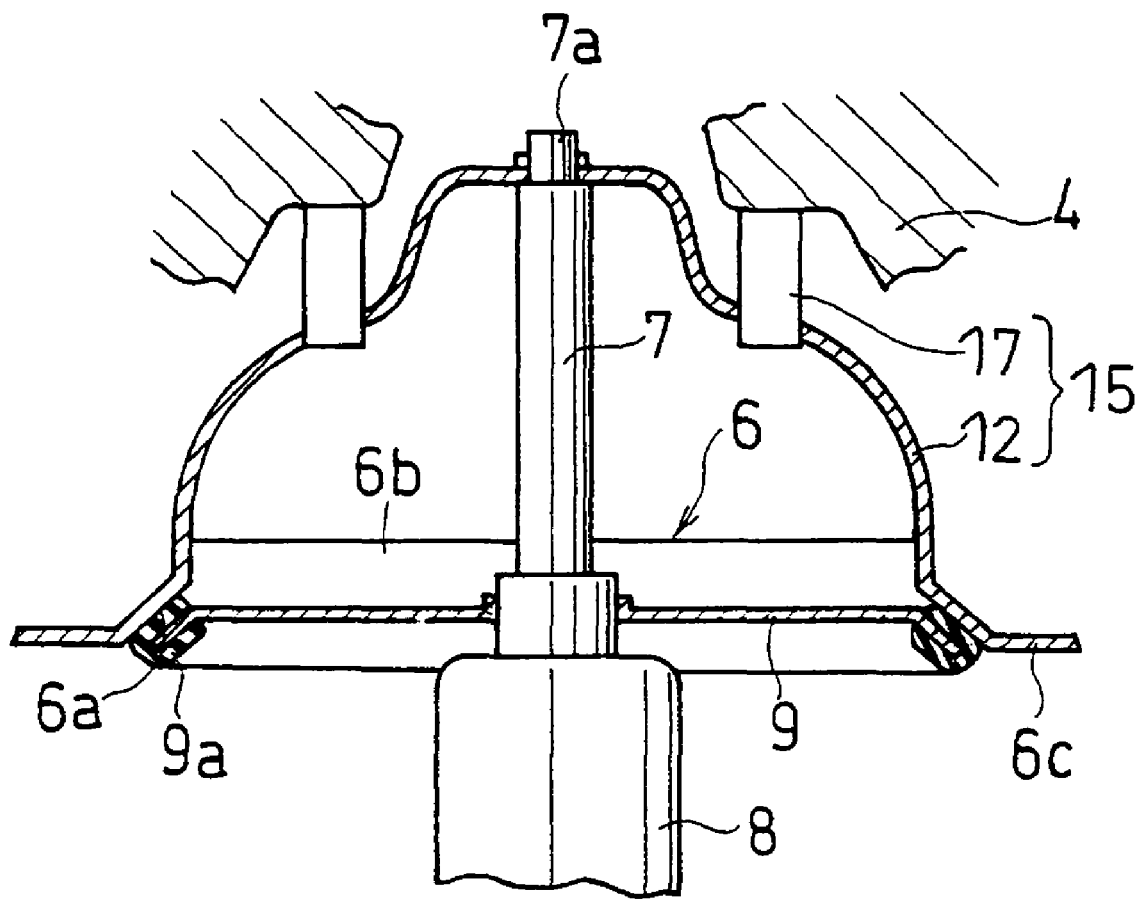
FIG. 11 is a view similar to that of FIG. 9 and shows a modified example of the embodiment.

The best mode for carrying out the present invention is explained referring to the drawings. FIG. 1 is a vertical sectional view showing the first embodiment of a thermostat installing structure according to the present invention. FIG. 2 is a plan view of the thermostat in the same embodiment. FIG. 3 is a view showing a modified example of the embodiment corresponding to a fragmental section along the line A-A of FIG. 2. FIG. 4a, FIG. 4b and FIG. 4c show a modified example of the embodiment corresponding to the part "B" in FIG. 1. FIG. 5 is a sectional view of the substantial part of the second embodiment according to the present invention. FIG. 6 is a sectional view of the third embodiment according to the present invention. FIG. 7a, FIG. 7b and FIG. 7c show a modified example of the embodiment corresponding to the part "C" in FIG. 6. FIG. 8 is a view similar to that of FIG. 6 in a further modified example of the embodiment. FIG. 9 is a sectional view of the substantial part of the fourth embodiment according to the present invention. FIG. 10 is a fragmental enlarged sectional view along the line D-D of FIG. 9. FIG. 11 is a view similar to that of FIG. 9 and shows a modified example of the embodiment.

Embodiment 1

FIG. 1 shows an example in which the thermostat installing structure of the present invention is applied when the internal combustion engine is a water cooling engine. In the figure, a thermostat 5 is provided for executing the flow control of a cooling water radiated and cooled by a radiator (cooling body) 3 via an inlet housing 4 constituting a part of a circulation path of cooling water (circulation path of cooling medium) 40 into a cooling water channel (cooling medium channel) 2 connected to a water jacket (not shown) of an engine body (cylinder head) 1 as an internal combustion engine and is interposed between the circulation path of cooling water 40 and the cooling water channel 2 of the engine body 1.

The thermostat 5 comprises an annular supporting substrate 6 of which inner periphery serves as a valve seat 6a, a valve casing 8 having a rod 7 extendable by the temperature of the cooling water in the cooling water channel 2 of the engine body 1, a valve body 9 which is fixed on the valve casing 8 and contacts with and separates from the valve seat 6a, a supporting frame 11 which is integrally formed with the supporting substrate 6 so as to slidably guide the valve casing 8 in the longitudinal direction of the rod 7 and which elastically provides a compression coil spring (resilient means) 10 for elastically energizing the valve body 9 into the valve seat 6a side between the valve body 9 and itself, a regulatory frame 12 for regulating the projecting head of the rod 7, integrally formed with the supporting substrate 6, and a gasket 13 integrally formed on the both surfaces of the supporting substrate 6 so as to cover the outer circumferential edge.

The annular supporting substrate 6 is obtained by metal processing of a steel sheet and the regulatory frame 12 is formed along the diametrical direction of the annular supporting substrate 6, integrally formed like an arch in the form of an isosceles triangle when seen from the side from a vertical portion (cylindrical portion) 6b continued from the inner diameter side of the tapered valve seat 6a and the head portion 7a of the rod 7 is fixed at the top of the regulatory frame 12. A pair of tongue pieces 14, 14 bending in an expanding diametrical direction are cut and raised by metal sheet processing from the edge of the vertical portion 6b which is positioned so as to be orthogonal to the regulatory frame 12. In addition, a plate-like flange portion 6c is continued at the outer diameter side of the valve seat 6a of the annular supporting substrate 6 and the gasket 13 is integrally fixed at the outer circumferential side of the flange portion 6c so as to cover the outer circumferential edge portion and extend into the upper surface and the lower surface. In the figure, the gasket 13 is made of a rubber material integrally fixed by a vulcanizing adhesion, however, the present invention does not exclude the gasket which is separately formed and assembled to be integrated and the gasket made of an elastic resin.

The valve body 9 comprises a disk-like body made of steel plate, its outer circumferential edge is tapered so as to match the valve seat 6a, and a seal 9a made of a rubber material is fixed at the tapered portion. The valve body 9 is fixed in concentric with the valve casing 8 and is always energized upwardly by a compression spring 10 elastically provided between the supporting frame 11. Thus the seal 9a is elastically provided to the valve seat 6a and the valve seat 6a is kept in a closed condition. A thermo-wax (not shown) which is normally in a crystallized condition but is fluidized and expanded when the temperature goes up is enclosed in the valve casing 8. It is constructed such that when the thermo-wax is expanded following the increase of temperature, the rod 7 is extended and when it is crystallized following the decrease of temperature; the volume is reduced to contract the rod 7. When the rod 7 is going to extend as mentioned above, because the head portion 7a is prevented from projecting by the regulatory frame 12 therefrom, the reaction force acts on the valve casing 8, and the valve casing 8 is guided with the supporting frame 11 and pushed down into the position shown with two-dotted lines shown in FIG. 1. Accordingly, the valve body 9 goes down into the position shown with the dotted lines to release the pressed relation with the valve seat 6a, then the valve is opened.

The supporting frame 11 is processed to form a letter U from a metal sheet, the upper end is fixed under a flange portion 6c of the annular supporting substrate 6, and at the center of the lower hem there provided a guide tubular portion 8a which is fitted into the outer circumferential portion of the valve casing 8a and allows the rod 7 to slidably move along the axial direction. The compression spring 10 is elastically provided under compressed condition between the circumferential portion of the guide tubular portion 8a and the flange portion 6c.

A pair of recess portions 4a are provided for the inner wall corresponding to the tongue piece 14 of the circulation path of cooling water 40 of the inlet housing 4 and a fixing means 15 is constituted with the recess portion 4a and the tongue piece 14. Namely, when the thermostat 5 is fixed in the inlet housing 4 as mentioned later, the tip portion 14a of the tongue piece 14 is received in the recess portion 4a. A step portion 4c capable of receiving the gasket 13 is formed at the circumferential edge portion of the lower end opening of the inlet housing 4 along its circumferential direction.

Next explained is how the above-mentioned thermostat 5 is interposed to be attached and fixed between the cooling water channel 2 of the engine body 1 and the circulation path of cooling water 40 of the inlet housing 4. The thermostat 5 is inserted into the circulation path of cooling water 40 from the head portion 7a of the rod 7 while elastically deforming the tongue piece 14 into the contracting diametrical direction and the tip portion 14a is elastically contained in the recess portion 4a by the restoring resilience followed by releasing the elastic deformation of the tongue piece 14. The further tip end portion 14b of the tip portion 14a is upwardly bent to form like a claw and is also elastically received in the recess portion 4a, thereby fixing the thermostat 5 in the inlet housing 4. The gasket 13 is received in the step portion 4b at this time. The tongue piece 14 is kept directing into the expanding diametrical direction by the restoring resilience, so that it is stably kept in a fixed condition without coming off the recess portion 4a.

As mentioned above, the thermostat 5 is stably fixed in the inlet housing 4 by the fixing means 15, so that it is packaged together with the inlet housing 4 to be brought into the final assembling station. A set of the thermostat 5 and the inlet housing 4 is combined into a predetermined position of the engine body 1 and the inlet housing 4 is integrally fastened into the engine body 1 with a plurality of bolts 16. FIG. 1 shows the condition before fastening, but after fastening the gasket 13 is interposed under compressed condition between the step portion 4b of the inlet housing 4 and the circumferential edge portion of the inlet opening of the cooling water channel 2 of the engine body 1. Thus, the circulation path of cooling water 40 of the inlet housing 4 and the cooling water channel 2 of the engine body 1 are communicated and the connecting portion thereof is sealed. The gasket 13 achieves only the sealing function of the connecting portion, so that an appropriate material is selected in order to bring out the sealing function by compression.

Accordingly, the thermostat 5 is attached and fixed at an appropriate position between the inlet housing 4 and the engine body 1, namely between the circulation path of cooling water 40 and the cooling water channel 2. At this time, if there is position displacement by the design tolerance between the inlet housing 4 and the engine body 1, the stress caused by fastening is absorbed in a received portion because the tongue piece 14 is only received in the recess portion 4a by means of the tip portion 14a, so that the stress does not act on the sealing portion by the thermostat 5 and the gasket 13 and the function of the thermostat 5 and the sealing abilities are not damaged. Specifically, when the tip portion 14a of the tongue piece 14 is elastically received in the recess portion 4a like the present embodiment, the stress absorbing function becomes remarkable.

According to thus fixed thermostat 5, the valve case 8 is positioned in the cooling water channel 2 communicated with the water jacket (not shown) in the engine body 1, so that the thermostat 5 is exposed to the flow of cooling water circulating in the water jacket. When the temperature of the cooling water in the water jacket is increased when actuating the engine, the thermo-wax in the valve casing 8 is expanded to extend the rod 7. The head portion 7a of the rod 7 is regulated by the regulatory frame 12, the reaction force by the extension of the rod 7 acts on the valve casing 8, the valve casing 8 is pushed down by being guided by the guide tubular portion 8a against the resilience of the compression spring 10, then the valve body 9 goes down and the seal 9a is separated from the valve seat 6a to open the valve. When the valve is thus opened, the cooling water radiated and cooled by the radiator 3 flows into the cooling water channel 2 from the circulation path of cooling water 40 and the temperature of the cooling water in the water jacket is controlled. When the temperature of the cooling water in the water jacket goes down, the thermo-wax in the valve casing 8 returns to its original crystallized condition, the rod 7 is contracted, and the valve body 9 and the valve seat 6a return to a closed condition by the restoring resilience of the compression spring 10. These operations are repeated depending on the temperature of the cooling water in the water jacket, thereby keeping the cooling water in the water jacket at an appropriate temperature.

Following the flow of the cooling water into the cooling water channel 2, the cooling water at high temperature is returned into the radiator 3 from the cooling water channel outlet through the outlet housing, a water pump and a circulation path of cooling water (not shown). In case of a water cooling engine, a similar thermostat may be provided at the connecting portion of the outlet of the cooling water channel and the outlet housing communicated with the radiator and the temperature of the cooling water circulating in the water jacket of the engine body may be controlled. In this case, the thermostat installing structure of the present invention can be applied. Further, like the thermostat apparatus disclosed in the patent document 2, a second valve body interlocked with the valve casing 8 may be provided at the end of the valve casing 8 such that the second valve body is opened when the valve body 9 is closed and the second valve body is closed when the valve body 9 is opened and the thermostat installing structure of the present invention may be applied to the cooling water temperature control mechanism of the internal combustion engine as disclosed in the patent document 2.

FIG. 3 shows a modified example of the embodiment of the tongue piece 14. The bottom portion 14c extending to the tip portion 14a from the rising base portion of the tongue piece 14 is widely formed along the circumferential direction of the inner circumferential edge portion of the supporting substrate 6. The bottom portion 14c thus widely formed is bent so as to warp back into the expanding diametrical direction, thereby rectifying the cooling water like an infundibulum to improve the inflow ability of the cooling water into the cooling water channel 2. Further, punching out portions for forming the regulatory frame 12 are effectively used, so that the waste of sheet metal material can be reduced.

FIG. 4a, FIG. 4b, and FIG. 4c show modified examples of the tongue piece 14. In FIG. 4a, the tip portion 14a is linear, thereby obtaining an advantage that processing is easy and there is no obstacle for receiving and fixing when the recessed front face of the recess portion 4a is narrow. In FIG. 4b, the further tip end portion 14d of the tip portion 14a is bent like an upward dogleg to elastically contain the bent portion in the recess portion 4a. In this embodiment, when the tongue piece 14 is received in the recess portion 4a and the tip end portion 14d comes into contact with the open edge of the lower end of the inlet housing 4 so as to push up the thermostat 5, the tongue piece 14 is elastically deformed into the contracting diametrical direction by the action of the tip end portion 14d, the bent portion is fitted in the recess portion 4a by the restoring resilience, thereby achieving a superior fixing and attaching ability. In FIG. 4c, a further tip end portion 14e of the tip portion 14a is bent downward like the letter U. In this embodiment, the received portion in the recess portion 4a is strengthened to improve the fixing ability and stability. These several examples may be optionally selected and adopted as design matter considering the workability and handleability.

Embodiment 2

FIG. 5 shows the second embodiment in which a tongue piece 14A constituting the fixing means 15 is prepared separate from the supporting substrate 6 and is integrally connected with the flange portion 6c of the supporting substrate 6. The tip portion 14Aa of the tongue piece 14A is bent in an expanding diametrical direction and the base portion is integrally connected with the flange portion 6c. Such an integration is achieved by welding, an adhesive agent, caulking, screwing and so on. In the figure, integration is achieved by caulking. This embodiment has such a merit that there is no restriction where the tongue piece 14A is formed, unlike the tongue piece 14 cut and raised from the supporting substrate 6 in the first embodiment. Other structures are the same as those in the first embodiment, so the common members have the same reference numerals and their explanation is omitted here.

Embodiment 3

FIG. 6 shows the third embodiment and FIG. 7a, FIG. 7b and FIG. 7c show its modified examples. The thermostat fixing means 15 in this embodiment comprises at least a pair of tongue pieces 14C having a rising portion (constituting a part of a vertical portion 6b continued into the inner diameter side of the valve seat 6a) 14Ca raised from the supporting substrate 6 and a spring piece portion 14Cb of which tip portion is bent. The fixing means 15 further comprises the step portion 4c formed in the inner wall face of the circulation path of cooling water 40 of the inlet housing 4 and capable of elastically supporting the thermostat 5 by elastically contacting the spring piece portion 14Cb of the tongue piece 14C.

The tongue piece 14C in FIG. 6 is cut and raised from the opposite positions at 180 degrees of the supporting substrate 6 (position orthogonal to the regulatory frame 12) and the spring piece portion 14Cb is bent in the expanding diametrical direction to faun a curved condition like a reversed letter U. The step portion 4c is formed all around the periphery of the lower end opening of the circulation path of cooling water 40 and its depth in the expanding diametrical direction is designed to cover the spring piece portion 14Cb from the rising portion 14Ca. Thus formed step portion 4c improves the inflow ability and rectifying ability of the cooling water into the valve opening. The spring piece portion 14Cb is designed to elastically contact with a vertical step wall portion 4ca into a centrifugal direction which constitutes an inner circumferential wall of the step portion 4c. The inner diameter of the vertical step wall portion 4ca is designed to be smaller than the distance between the tip ends of the pair of spring piece portions 14Cb, 14Cb when the external force is not applied (contracting force is not applied). A recessed step portion 1a capable of receiving the gasket 13 in the circumferential direction is provided at the open circumferential edge portion of the cooling water channel 2 of the engine body 1.

When the thermostat 5 is attached and fixed at a predetermined place in this embodiment, the spring piece portion 14Cb is touched to the vertical step wall portion 4ca of the step portion 4c and the thermostat 5 is pushed up, then the spring piece portion 14Cb receives the contracting force to deform elastically by the action of the vertical step wall portion 4ca and the spring piece portion 14Cb elastically contacts the vertical step wall 4ca by the restoring resilience into the expanding diametrical direction thereafter. The thermostat 5 can be elastically mounted and supported between the opposing vertical step wall portion 4ca without falling when it is out of hands by the antagonistic activity followed by the elastic contact in the expanding diametrical direction. Therefore, as mentioned above, the thermostat 5 can be packaged with the inlet housing 4 under such conditions to be brought in the final assembly stage. In this case, the step portion 4c is formed all the circumference, so that the elastic mounting of the tongue piece 14C against the step portion 4c can be executed at any position in the circumferential direction.

When the tongue piece 14C is elastically mounted on the step portion 4c, the upper face of the gasket 13 is preferably designed to contact the lower end face of the inlet housing 4 and the depth of the step portion 4c in the axial direction is set so as to secure the gap between the tongue piece 14C and the upper wall face of the step portion 4c as shown in the figure. Then the inlet housing 4 is integrated into a predetermined position of the engine body 1 together with the thermostat 5. The gasket 13 is received in the recessed step portion 1a and the inlet housing 4 is integrally fastened to the engine body 1 by means of a plurality of bolts 16. As mentioned above, the gasket 13 is interposed under a compressed condition by fastening between the recessed step portion 1a of the engine body 1 and the open circumferential edge portion of the circulation path of cooling water 40 of the inlet housing 4. Thus the circulation path of cooling water 40 of the inlet housing 4 and the cooling water channel 2 of the engine body 1 are communicated and the connecting portion thereof is sealed.

Accordingly, the thermostat 5 is mounted and fixed at a predetermined position between the inlet housing 4 and the engine body 1, namely between the circulation path of cooling water 40 and the cooling water channel 2. At this time, if there is position displacement by the design tolerance between the inlet housing 4 and the engine body 1, the stress caused by fastening is absorbed by the spring piece portion 14Cb and further is absorbed in the gap between the tongue piece 14C and the upper wall face of the step portion 4c because the spring piece portion 14Cb of the tongue piece 14C is elastically contacted with the vertical step wall portion 4ca, so that the stress does not act on the sealing portion by the thermostat 5 and the gasket 13 and the function and the sealing abilities of the thermostat 5 are not damaged. Further, as mentioned above, the valve body 9 is automatically and repeatedly opened and closed by the temperature of the cooling water in the water jacket, thereby keeping the cooling water at an appropriate temperature in the water jacket. Other constructions are the same as those of FIG. 1 so the common members have the same reference numerals and their explanation is omitted here.

The shape of the tongue piece portion 14C in FIG. 7a among those in FIG. 7a, FIG. 7b, and FIG. 7c which show the modified examples of the third embodiments is different from those of the tongue piece portion 14C in FIG. 6 in that the tip portion continued to the rising portion 14Ca is bent into the expanding diametrical direction and is further bent in the form of a dogleg spring piece portion 14Cc. However, they are the same in that the thermostat 5 is elastically mounted on and supported by the inlet housing 4 by elastically contacting the spring piece portion 14Cc into the vertical step wall 4ca facing the centrifugal direction of the step portion 4c. On the other hand, the tongue piece 14C in FIG. 7b and FIG. 7c is different from the one in FIG. 7a in that the tip portion continued to the rising portion 14Ca is bent in the contracting diametrical direction and is further bent in the adunc form 14Cd or in the dogleg form 14Ce and the spring piece portion 14Cc elastically contacts the vertical step wall portion 4cb facing the centrifugal direction of the step portion 4c. Namely, the spring piece portions are different such that in the embodiments in FIG. 6 and FIG. 7a, the spring piece portions 14Cb and 14Cc have the restoring resilience into the expanding diametrical direction and elastically contact the vertical step wall portion 4ca in the centripetal direction, however, the spring piece portions 14Cd, 14Ce in FIG. 7b and FIG. 7c have the restoring resilience into the contracting diametrical direction and elastically contacts the vertical step wall 4cb in the centrifugal direction. How the thermostat 5 is fixed by the fixing means 15 is the same as mentioned above and is appropriately selected and adopted as a design matter considering the workability and handleability.

FIG. 8 shows a further modified example of this embodiment in which the step portion 4c is provided at two positions corresponding to the pieces 14C and a step portion 4d is continued into the step portion 4c, has smaller depth in the axial direction than the step portion 4c, and is formed along the circumferential direction. Further, a recessed step portion 4e capable of receiving the bottom portion of the regulatory frame 12 is continuously formed into the step portion 4d at the bottom portion. In this embodiment, the inflow rectification ability of the cooling water into the valve opening is preferably kept and the positioning of elastic mounting of the tongue piece 14C into the step portion 4c can be appropriately done. Other constructions are the same as the above-mentioned embodiment so the common members have the same reference numerals and their explanation is omitted here.

Embodiment 4

FIG. 9 and FIG. 10 show the fourth embodiment of the present invention and FIG. 11 shows its modified example. The fixing means 15 comprises a pair of projected portions 17 supporting the regulatory frame 12 projected from the inner wall face of the circulation path of cooling water 40 in the inlet housing 4 and the regulatory frame 12. The projected portion 17 has two-forked holding pieces 17a, 17a at its tip end and the thermostat 5 is fixed and supported in the inlet housing 4 by holding the regulatory frame 12 with these holding pieces 17a, 17a. According to this embodiment, the thermostat 5 is inserted from the lower end opening of the circulation path of cooling water 40, the regulatory frame 12 is inserted under pressure so as to push and spread the holding pieces 17a, 17a, the regulatory frame 12 is held in the space 17b made by the holding pieces 17a, 17a, so that the thermostat 5 can be held while being suspended in the inlet housing 4.

In the example in FIG. 11, the projected portion 17 is provided under the vertical condition from the inner wall face of the circulation path of cooling water 40 and the regulatory frame 12 and the inner wall faces of the circulation path of cooling water 40 are deformed accordingly. In this example, the projected portion 17 is vertically directed, so that the thermostat 5 can be surely mounted when it is inserted upwardly to be fixed and mounted. Such a fixing means 15 can easily fix the thermostat 5 at a predetermined position like the fixing means 15 mentioned in the above embodiments, and the same effects can be expected, thereby being preferable.

In the above-mentioned embodiments, the present invention is applied to a cooling system of water cooling engine, however, the thermostat installing structure of the present invention can be used for the engine and other internal combustion engine adapting a cooling system of a cooling oil. The number of the fixing means 15 is not limited to a pair, but it may be more than three if possible, its specific structures are not limited to the above embodiments, and other structures can be adopted as long as the thermostat 5 is safely fixed.

The invention claimed is:

1. A thermostat installing structure interposed between a cooling medium channel in an internal combustion engine body and a circulation path of cooling medium provided at a radiator side and connected to said internal combustion engine body in which said thermostat controls circulation of said cooling medium between said circulation path of cooling medium and said cooling medium channel, wherein said circulation path of the cooling medium is provided in an inlet housing attached to said internal combustion engine body to supply cooling medium to a cooling medium channel of said internal combustion engine body from said radiator, said thermostat comprising:
an annular supporting substrate of which an inner circumferential edge portion serves as a valve seat;
a valve casing having an extendable rod with a projected head, said extendable rod being so constructed as to be extended by the temperature of said cooling medium in said cooling medium channel of said internal combustion engine body;
a valve body secured to said valve casing and moved by said extendable rod to contact and separate from said valve seat for open and close operation;
a supporting frame integrally formed with said supporting substrate and provided with a resilient means to elastically support said valve body relative to said valve seat side, for slidably guiding said valve casing along the longitudinal direction of said rod;
a regulatory frame integrally formed with said supporting substrate, for regulating said projected head of said rod; and
a gasket fitted on said supporting substrate;
wherein a fixing means for said thermostat is provided between said supporting substrate and an inner wall portion of said circulation path of cooling medium,
whereby said thermostat is installed between said circulation path of cooling medium and said cooling medium channel of said internal combustion engine in a manner that said inlet housing and said internal combustion engine body are integrally fastened by interposing said gasket between said inlet housing and said internal combustion engine body after fixing said thermostat at a predetermined position in said circulation path of cooling medium with said fixing means, wherein said fixing means comprises a projected portion projecting from said inner wall face of said circulation path of cooling medium and supporting said regulatory frame therewith and said regulatory frame.

2. The thermostat installing structure as set forth in claim 1, wherein said projected portion has at its end a holding piece to hold and support said regulatory frame.

3. The thermostat installing structure as set forth in claim 2, wherein said internal combustion engine is a water cooling engine which uses a cooling water as said cooling medium and uses a radiator as a cooling body.

4. The thermostat installing structure as set forth in claim 1, wherein said internal combustion engine is a water cooling engine which uses a cooling water as said cooling medium and uses a radiator as a cooling body.

* * * * *